(12) United States Patent  
Wageman et al.

(10) Patent No.: US 9,003,302 B1
(45) Date of Patent: Apr. 7, 2015

(54) ANONYMOUS SIDEBAR METHOD AND SYSTEM

(75) Inventors: Anthony J. Wageman, Lee's Summit, MO (US); Diane E. Carder, Overland Park, KS (US); Thomas M. Sladek, Overland Park, KS (US); Ronald J. Rice, Lenexa, KS (US); Russell G. Kindred, Lake Quivira, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2207 days.

(21) Appl. No.: 11/950,845

(22) Filed: Dec. 5, 2007

(51) Int. Cl.
*G06F 3/00* (2006.01)
*H04L 29/06* (2006.01)
*G06F 3/0484* (2013.01)

(52) U.S. Cl.
CPC ............ *H04L 65/403* (2013.01); *G06F 3/0484* (2013.01)

(58) Field of Classification Search
CPC .. H04L 65/403; G06F 3/04842; G06F 3/0484
USPC ............................ 715/753, 755, 758; 709/204
See application file for complete search history.

(56) References Cited

U.S. PATENT DOCUMENTS

| | | | |
|---|---|---|---|
| 4,870,408 A | 9/1989 | Zdunek et al. | |
| 5,426,510 A | 6/1995 | Meredith | |
| 5,442,809 A | 8/1995 | Diaz et al. | |
| 5,568,511 A | 10/1996 | Lampe | |
| 5,617,539 A | 4/1997 | Ludwig et al. | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 5,995,827 A | 11/1999 | Gitlin et al. | |
| 6,014,556 A | 1/2000 | Bhatia et al. | |
| 6,032,051 A | 2/2000 | Hall et al. | |
| 6,041,241 A | 3/2000 | Willey | |

(Continued)

FOREIGN PATENT DOCUMENTS

| EP | 0 817 457 | 1/1998 |
|---|---|---|
| EP | 0 984 608 | 3/2000 |

OTHER PUBLICATIONS

Schulzrinne, et al., RTP: A Transport Protocol for Real-Time Applications, Jul. 2003, http://tools.ietf.org/pdf/rfc3550.pdf, section 5.3.1.*

(Continued)

*Primary Examiner* — Tuyetlien Tran

(57) ABSTRACT

A method and system for providing anonymous sidebars between participants in a existing conference session such as a push-to-talk session for instance. Each applicable participant in the session has a private handle that represents the participant but that does not reveal the true identity of the participant. Further, the conference server hosting the session maintains or has access to mapping data that correlates each participant's private handle with a participant identifier that is sufficient to allow the conference server to engage in network communication with the participant. The server provides each participant with a list of other participant's private handles, and a given participant can then initiate a sidebar by sending a sidebar-initiation request designating one or more private handles selected from the list. Using its mapping data, the server then identifies the corresponding participants and sets up the anonymous sidebar.

20 Claims, 4 Drawing Sheets

(56) References Cited

U.S. PATENT DOCUMENTS

| | | | |
|---|---|---|---|
| 6,119,017 A | 9/2000 | Cassidy et al. | |
| 6,161,137 A | 12/2000 | Ogdon et al. | |
| 6,178,323 B1 | 1/2001 | Nagata | |
| 6,236,854 B1 | 5/2001 | Bradshaw, Jr. | |
| 6,349,136 B1 | 2/2002 | Light et al. | |
| 6,363,411 B1 | 3/2002 | Dugan et al. | |
| 6,381,467 B1 | 4/2002 | Hill et al. | |
| 6,404,873 B1 | 6/2002 | Beyda et al. | |
| 6,490,452 B1 | 12/2002 | Boscovic et al. | |
| 6,501,763 B1 | 12/2002 | Bhagavath et al. | |
| 6,526,377 B1 | 2/2003 | Bubb | |
| 6,567,929 B1 | 5/2003 | Bhagavath et al. | |
| 6,598,075 B1 | 7/2003 | Ogdon et al. | |
| 6,622,016 B1 | 9/2003 | Sladek et al. | |
| 6,662,211 B1 | 12/2003 | Weller | |
| 6,697,858 B1 | 2/2004 | Ezerzer et al. | |
| 6,731,609 B1 | 5/2004 | Hirni et al. | |
| 6,771,644 B1 | 8/2004 | Brassil et al. | |
| 6,771,693 B2 | 8/2004 | Hackett | |
| 6,785,379 B1 | 8/2004 | Rogers et al. | |
| 6,788,946 B2 | 9/2004 | Winchell et al. | |
| 6,839,417 B2 | 1/2005 | Weisman et al. | |
| 6,865,604 B2 | 3/2005 | Nisani et al. | |
| 6,931,007 B2 | 8/2005 | Jones | |
| 6,934,756 B2 | 8/2005 | Maes | |
| 6,963,931 B2 | 11/2005 | Bunn et al. | |
| 7,127,487 B1 | 10/2006 | Wang et al. | |
| 7,151,749 B2 | 12/2006 | Vega-Garcia et al. | |
| 7,209,763 B2 | 4/2007 | Martin et al. | |
| 7,221,660 B1 | 5/2007 | Simonson et al. | |
| 7,272,658 B1 | 9/2007 | Edelman et al. | |
| 7,463,652 B2 | 12/2008 | Karol et al. | |
| 7,636,750 B2* | 12/2009 | Haldar | 709/204 |
| 7,756,540 B2* | 7/2010 | Tillet et al. | 455/518 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2002/0191635 A1 | 12/2002 | Chow et al. | |
| 2003/0008657 A1 | 1/2003 | Rosen et al. | |
| 2003/0021264 A1 | 1/2003 | Zhakov et al. | |
| 2003/0072269 A1 | 4/2003 | Teruhi et al. | |
| 2003/0107994 A1 | 6/2003 | Jacobs et al. | |
| 2003/0114156 A1 | 6/2003 | Kinnavy | |
| 2003/0182374 A1 | 9/2003 | Haldar | |
| 2003/0231634 A1 | 12/2003 | Henderson et al. | |
| 2004/0028010 A1 | 2/2004 | Harris et al. | |
| 2004/0076277 A1 | 4/2004 | Kuusinen et al. | |
| 2004/0236593 A1 | 11/2004 | Swanson et al. | |
| 2005/0259803 A1* | 11/2005 | Khartabil | 379/202.01 |
| 2006/0046759 A1* | 3/2006 | Yoon et al. | 455/518 |
| 2006/0053225 A1* | 3/2006 | Poikselka et al. | 709/227 |
| 2006/0063552 A1* | 3/2006 | Tillet et al. | 455/519 |
| 2007/0036100 A1* | 2/2007 | Shaffer et al. | 370/328 |
| 2007/0123284 A1 | 5/2007 | Schliwa-Bertling et al. | |

OTHER PUBLICATIONS

Office Action from U.S. Appl. No. 10/629,360, dated Aug. 27, 2007.
Office Action from U.S. Appl. No. 10/629,360, dated Dec. 10, 2007.
Office Action from U.S. Appl. No. 12/133,474, dated Apr. 2, 2010.
Office Action from U.S. Appl. No. 12/133,474, dated Jul. 21, 2010.
Office Action from U.S. Appl. No. 12/133,474, dated Oct. 29, 2010.
U.S. Appl. No. 10/629,360, filed Jul. 29, 2003.
Office Action from U.S. Appl. No. 10/067,080, dated Apr. 27, 2004.
Office Action from U.S. Appl. No. 10/067,080, dated May 21, 2003.
OMA, Discussion and definitions on PoC Floor Control, Input Contribution, Doc#OMA-REQ-2003-0375-PoC_Floor_Control, Jun. 2000.
OMA, "PoC Use case: Mobile—PC Example," Input Contribution, Doc#OMA-REQ-2003-0323 PoC Mobile-PC use case, May 5, 2003.
OMA, "PoC Use case: Multimedia Group Call Example," Input Contribution, Doc#OMA-REQ-2003-0306-PoC UseCase-group-multimedia-scenario, May 6, 2003.
OMA, "PoC Use case: Examples of User Requirements," Input Contribution, Doc#OMA-REQ2003-0305-PoC Use Case, May 6, 2003.
OMA, "Inputs for PoC Requirements Document," Input Contribution, Doc#OMA-REQ-2003-0367-PoC_Input_Motorola, May 29, 2003.
OMA, "Push to Talk over Cellular (PoC)," Version: 0.1.6, May 12, 2003.
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002.
$3^{rd}$ Generation Partnership Project 2 "3GPPS", Fast Call Set-Up, Version 1, Apr. 15, 2002.
"Qualcomm chats Up 'Push-to-Talk'," http://siliconvalley.internet.com/news/print.php/953261, printed from the World Wide Web on Jan. 27, 2003.
Mobile Tornada, http://www.mobiletornado.com/products_iprsptt.html, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URL," Network Working Group, Apr. 2001.
Ericsson, www.telecomcorridor.com/wireless%20horizons/1Coyne.pdf, printed from the World Wide Web on Jun. 27, 2001.
Kutscher and Ott, "The Message Bus—A Communication & Integration Infrastructure for Component-Based Systems," White Paper, Jan. 2000.
Ott et al., "A Message Bus for Local Coordination," Network Working Group, Internet Draft, May 30, 2001.
TR45, Medium Access Control (MAC) Standard for cdma2000 Spread Spectrum System, IS-2000-3, Jul. 12, 1999.
$3^{rd}$ Generation Partnership Project 2 '3GPPS', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task Force Request for Comments 2003, Oct. 1996.
Perkins, "Minimal Encapsulation within IP," Internet Engineering Task Force Request for Comments 2004, Oct. 1996.
Solomon, "Applicability Statement for IP Mobility Support," Internet Engineering task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task Force Request for Comment 2616, Jun. 1999.
Rigney et al., Remote Authentication Dial in User Service (RADIUS), Internet Engineering Task Force Request for Comment 2865, Jun. 2000.
Rigney, "RADIUS Accounting," Internet Engineering Task Force Request for Comment 2866, Jun. 2000.

(56) References Cited

OTHER PUBLICATIONS

Schulzrinne et al., "RTP: A Transport Protocol for Real Time Application," Network Working Group, Request for Comments: 1889, Jan. 1996.

Cellatoglu et al., "Performance of RTP/UDP/IP header compression in cellular networks," London Communications Symposium, University College London, Sep. 2000.

Cellatoglu et al., "Robust Header Compression for Real-Time Services in Cellular Networks," in Proc. of $2^{nd}$ In Conf. on 3G Mobile Communication Technologies, pp. 124-128, Mar. 2001.

Bettstetter et al., GSM Phase 2+ General Packet Radio Service GPRS: Architecture, Protocols, and Air Interface, IEEE Communications Surveys, vol. 2 No. 3, pp. 2-14, 1999.

Niemi et al., Multi-party Instant Message (IM) Session Using the Message Session Relay Protocol (MSRP), Network Working Group, Internet Draft, Jun. 12, 2007.

Wang, Anonymous Wireless Authentication on a Portable Cellular Mobile system, IEEE Transactions on Computers, vol. 53, No. 10, pp. 1317-1329, Oct. 2004.

Even and Ismail, "Conferencing Scenarios," XCON, Internet Draft, Sep. 6, 2005.

Even and Ismail, "Conferencing Scenarios," XCON, Internet Draft, Nov. 2003.

Mahy and Ismail, "Media Policy manipulation in the Conference Policy Control Protocol," SIP WG, Internet Draft, Feb. 24, 2003.

\* cited by examiner

ANONYMOUS SIDEBAR METHOD AND SYSTEM

BACKGROUND

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). The server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance. The core industry standards for SIP (Internet Engineering Task Force (IETF) Request For Comments (RFC) 3261) and RTP (IETF RFC 1889) are hereby incorporated by reference.

According to RTP and its associated Real Time Control Protocol (RTCP), each packet in an RTP media stream can include an RTP header having certain defined fields, including (i) a sequence number, which indicates a position of the packet in the stream, (ii) a timestamp, which indicates the instant when the data in the packet was established (sampled), (iii) a payload type, which indicates the format of the media, to enable a receiving end to play out the media, (iv) a "synchronization source (SSRC) identifier," which is a randomly generated code that distinguishes the source from others in the session, and (v) optionally one or more "contributing source (CSRC) identifiers" indicating the SSRCs of each stream that formed the basis for the RTP stream. Furthermore, according to SIP, a server may engage in session setup and control signaling with various parties by reference to their SIP identifiers or "SIP addresses".

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices such as cellular mobile stations, that are equipped to establish wireless packet-data connectivity and to engage in voice-over-packet (VoP) communication. Alternatively, some or all of the stations could be other sorts of devices, such as multi-media personal computers or Ethernet-telephones, that can establish packet data connectivity and engage in VoP communication through landline connections. Further, each station could be equipped with a PTT button or other mechanism that a user can engage in order to initiate an PTT session or to request the floor during an ongoing session.

In addition, the same basic functionality can be applied with respect to other media types beyond voice, such as video or multi-media for instance, and may be generally characterized as push-to-x (PTX). Thus, another example of such functionality would be push-to-view (PTV), involving video conferencing.

OVERVIEW

Disclosed herein is a method and system for providing anonymous sidebars between participants in a existing conference session such as a PTX session for instance. Each applicable participant in the session has a private handle that represents the participant but that does not reveal the true identity (e.g., name or telephone number) of the participant. Further, the conference server hosting the session maintains or has access to mapping data that correlates each participant's private handle with a participant identifier (e.g., an RTCP SSRC, or a SIP address) that is sufficient to allow the conference server to engage in network communication with the participant.

In practice, the conference server hosting the session provides each participant with a list of the private handles of the other participants, and a participant may then elect to initiate an anonymous sidebar by referring to the private handles, without the need to know who the other participants actually are. To initiate an anonymous sidebar, a party may select one or more private handles from those listed and may then send to the conference server a sidebar initiation request designating the selected private handles. The conference server may then refer to the mapping data to determine for each designated private handle a respective session participant. And the conference server may then establish a sidebar between the requesting party and each designated party, still without the parties learning each other's true identities.

The exemplary method is particularly useful in an open-conferencing scenario, where people join into an open (e.g., publicly accessible) conference and use private handles to refer to each other during the conference, similar to the handles used years ago in Citizen's Band radio communications. In such a scenario, a subset of the conference participants may wish to establish a sidebar to privately discuss a particular topic of interest, but may still wish to preserve their anonymity. Thus, the present method can apply in that scenario to enable anonymous sidebars. Further, the method can apply in numerous other scenarios as well.

These as well as other aspects, advantages, and alternatives will become apparent to those of ordinary skill in the art by reading the following detailed description with reference where appropriate to the accompanying drawings. Further, it should be understood that the description in this overview section and elsewhere in this document is not intended to be limiting but is merely provided to illustrate the concept by way of example.

DETAILED DESCRIPTION

Figure 1:
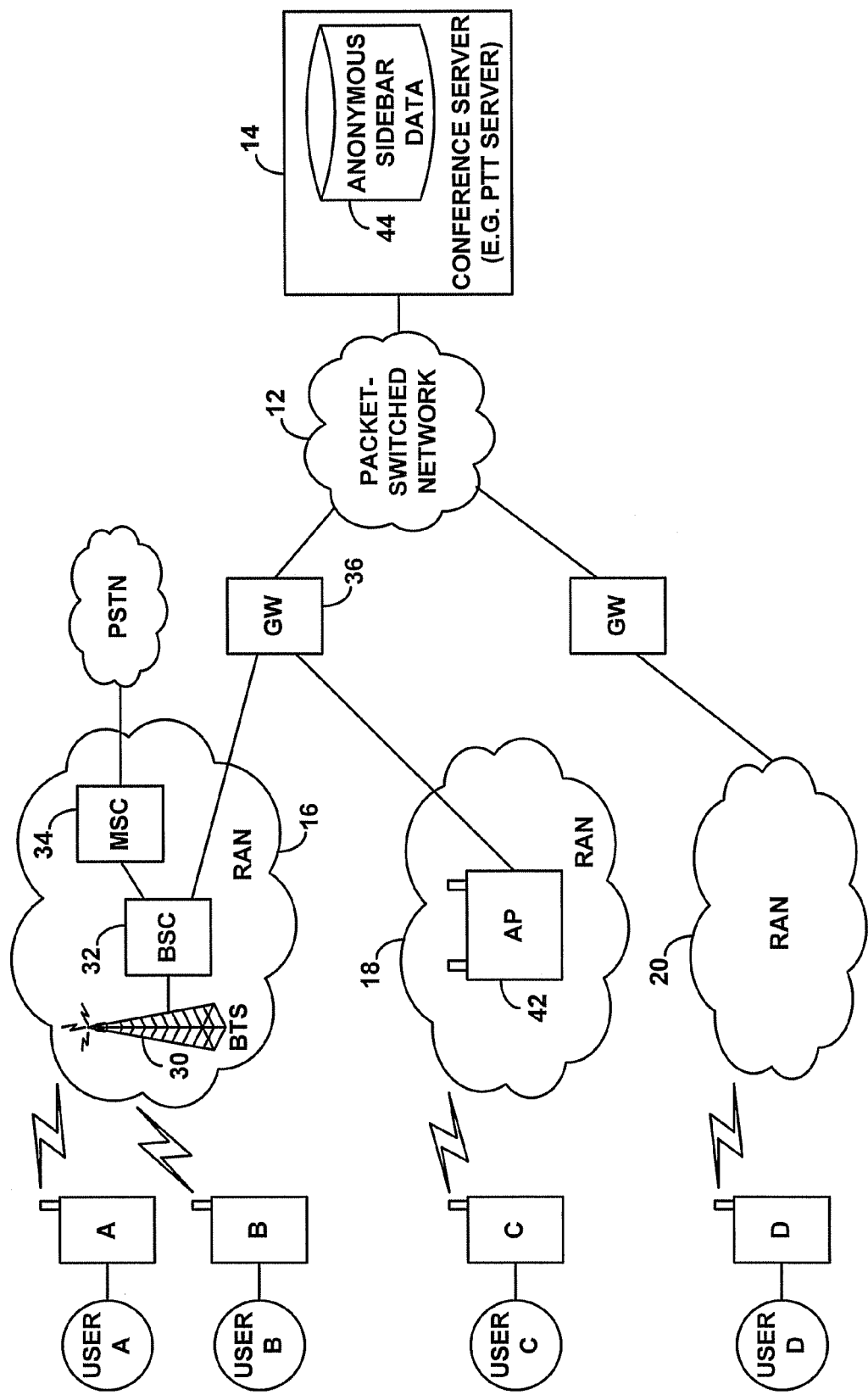
FIG. 1 is a simplified block diagram of a network in which the exemplary method can be implemented.

The present method involves establishing an anonymous sidebar during an ongoing session in which session participants communicate with each other through a central server, and in which each participant has a private handle that represents the participant. In particular, each person participating in the conference may have a handle that the person uses to identify himself or herself when talking to other people without the other people knowing the person's true identity, thus preserving anonymity.

Pursuant to the method, various functions are carried out by or for the central server during the ongoing session.

To start, the central server will transmit to each of the participants a specification of the private handles of the other participants. For instance, if the main conference involves parties A, B, C, and D, the server may provide party A with a specification listing the private handles of parties B, C, and D, the server may provide party B with a specification listing the private handles of parties A, C, and D, the server may provide party C with a specification listing the private handles of parties A, B, and D, and the server may provide party D with a specification listing the private handles of parties A, B, and C. In this manner, each party will have a list of the private handles of other session participants and will be able to select the private handles of one or more parties with whom to initiate an anonymous sidebar, without having to know the true identities of the other parties. (In an alternative embodiment, the server may simply send to each participant a common specification listing the private handles of all participants, without the need to tailor specifications per participants.)

The server may transmit the specification to each party in any of a variety of forms. For instance, the server may transmit the specification within an RTP header extension (as defined by the RTP protocol), within an RTCP message, or within a SIP message. Other examples are possible as well or will be developed in the future.

In turn, still during the ongoing session, the server will receive from a given one of the participants a user-selection of one or more private handles from the specification transmitted to the participant. For instance, upon receipt of a specification listing private handles B, C, and D (corresponding with parties B, C, and D), device A may programmatically present the list to user A, and user A may select private handles C and D for an anonymous sidebar. Device A may then send to the central server a sidebar-initiation request (e.g., an RTP, RTCP, or SIP based message) designating the selected private handles C and D.

Responsive to receipt of the user-selection (e.g., upon receipt of the sidebar-initiation request), the server may then readily refer to its private handle data in order to identify the actual conference participants having the designated private handles. And the server may then establish a sidebar between the requesting party (the given participant) and each of one or more participants having the private handles designated by the requesting party. In particular, the server may simply bridge together the communications of those participants and the requesting party, while segregating those communications from other communications of the session (e.g., with the sidebar communications not being sent to remaining session participants), thus establishing a private sidebar.

In practice, the server may seek and obtain approval from the sidebar invitees before initiating the sidebar in this manner (again, using any desired signaling protocol, such as RTP, RTCP, or SIP for instance). By way of example, once the server has identified each sidebar invitee, the server may transmit to each such invitee an invitation to participate in the requested sidebar. The server may then receive from each invitee an approval to participate in the requested sidebar. And in response, the server may then segregate communications between the requesting party and each invitee from remaining communications of the ongoing session. Alternatively, if any invitee declines the invitation, the server may exclude that invitee from the sidebar.

Further, while the anonymous sidebar is in progress, the server may receive from one of the sidebar participants an exit-request, seeking to exit the sidebar and return to the main session. In response, the server may then remove that particular participant from the anonymous sidebar and may automatically return the participant to the ongoing session.

In a further arrangement, the server may allow at least one participant in the anonymous sidebar to concurrently participate in both the sidebar and the ongoing session. For instance, the server may allow the participant to hear communications of the ongoing session but the server may transmit sidebar communications from the participant to only the other sidebar participants, not to any other remaining session participants. A given participant may negotiate with the server to achieve this setup. Alternatively, all of the sidebar participants may be blocked from receiving communications of the ongoing session while the sidebar is in progress.

In a preferred arrangement, before the server transmits the specification to each participant, the server will work with each participant to verify or update the participant's private handle, so that the server has a record of the applicable private handle for the person. In particular, during the ongoing session, before the server transmits the specification, the server may transmit to each of participant an indication of a private handle that is already defined for the participant (or a request for the participant to define a private handle in place of a null handle currently defined (i.e., no handle yet defined) for the participant), so that the participating user approve or revise the handle for use during the session. When a participating device receives the request, the device may present it to its user, and the user may then enter an approval or a change or new private handle definition, which the device may then return to the server.

The server may thus receive from the given participant either an approval of the private handle or a definition of a new private handle for the given participant. And if the server receives a new handle, the server may then update or establish the participant's profile record and update the correlation data to properly correlate the private handle with the participant. This process advantageously offers users control over their private handles, enabling them to define special private handles just for particular sessions for instance.

Furthermore, possibly in conjunction with seeking verification or update of a participant's private handle (but possibly separate from (e.g., before or after) that function), the server may signal to each participant of the underlying session to determine whether the participant wishes to be involved with anonymous sidebar service. For instance, the server may transmit to each participant a request to participate in anonymous sidebar service (e.g., a request to be involved with any requested establishment of such a sidebar), and the server may receive from each participant a response (and may treat the lack of a response as receiving a negative response). The server may then base the specification on the response, such as by including in the specification the private handles of only those participants who have thereby indicated a desire to be involved.

In the exemplary embodiment, the private handle for each participant is a non-telephone number handle, in that it does not comprise the telephone number of the participating device/user, in addition to not comprising the person's actual name. Rather, the private handle preferably takes some other form that is anonymous, in that it does not state the true identity of the participant.

The ongoing session from which the exemplary anonymous sidebar is established is a session involving multiple participants, and the plurality of participants may cooperatively constitute a subset of the multiple participants who subscribe to anonymous sidebar service. Thus, in practice, the central server may additionally determine by reference to subscriber profile data which of the multiple participants subscribes to the anonymous sidebar service, in order to determine the plurality of participants to which the method applies.

In a preferred embodiment (but without limitation), the ongoing session may comprise a PTX session, and each of the participants of the plurality may comprise (e.g., include, use, or be) a PTX client device operated by a user. The PTX session may be a PTT session or a PTV session for instance or may take other forms now known or later developed.

Furthermore, the communications that occur between the central server and each participant may occur via a radio access network (RAN) that serves the participant and via an air interface between the radio access network and the participant. For instance, each participating device may be a cellular wireless device that is served by a cellular RAN and thus communicates wirelessly with the RAN and in turn via the RAN with the central server.

Characterized another way, the present method may provide for establishing an anonymous sidebar during an ongoing PTT session in which session participants communicate with each other through a PTT server, and in which each participant has a private handle representing the participant.

Pursuant to the method, the PTT server may initially identify a subset (e.g., a proper subset) of the participants that subscribe to anonymous sidebar service, at least in part by referring to profile data that indicates which participants subscribe to anonymous sidebar service for instance. The PTT server may then communicate with each participant of the subset to confirm or update the private handle of the session participant, in the manner described above for instance. In turn, the PTT server may then provide each participant of the subset with a specification that states the private handle of each other participant of the subset. The functions of identifying the participants and communicating the specification to each participant may occur during the PTT session (e.g., after the PTT session itself has been set up and is thus underway or capable of supporting bearer communication). Alternatively, the functions may occur at other times. For instance, the communicating function may occur during PTT session setup signaling, such as with SIP signaling messages conveyed between the participants and the PTT server. Other example variations are possible as well.

During the PTT session, the PTT server may then receive from a given one of the participants of the subset a sidebar-request (sidebar-initiation request), designating one or more private handles selected by the given session participant from the specification provided to the given participant. Further, still during the PTT session, in response to the sidebar-request, the PTT server may then correlate each designated private handle with a respective participant, by referring to its mapping/correlation data for instance. And the PTT server may then establish the anonymous sidebar, by segregating (i) communications between the given session participant and each respective participant from (ii) remaining communications of the ongoing session.

The method may continue, during the anonymous sidebar, with the PTT server receiving from a given participant of the anonymous sidebar an exit-request. In response, the PTT server may then remove that participant from the anonymous sidebar, preferably returning the participant to normal participation in the PTT session.

In yet another respect, a PTT server is provided, for carrying out functions such as those described above. An exemplary PTT server may include a network communication interface for sending and receiving communications on a packet-switched network, a processor, data storage, and program logic stored in the data storage and executable by the processor to carry out various functions described herein. In practice, the program logic may be executable to transmit to each of a plurality of participants of the PTT session a list that specifies a private handle respectively of each other participant of the plurality. Further, the program logic may be executable to receive from a given one of the participants a sidebar-request that designates one or more private handles selected by the given party from the transmitted list. And the program logic may be executable, responsive to the request, to correlate each designated private handle with a respective participant, and to set up a sidebar between the given participant and each respective participant.

In the exemplary PTT server, the data storage may additionally contain handle-data that correlates each participant of the plurality with a respective private handle. In that case, the act of correlating each designated private handle with a respective participant may involve referring to the handle-data to correlate each designated private handle with a respective participant, so that the PTT server would be able to include that participant's communications in the sidebar.

Further, as in the arrangements discussed above, the program logic of the PTT server may be additionally executable to communicate with each participant so as to confirm or update private handle data for the participant.

Referring now to the drawings, FIG. 1 is a simplified block diagram of a network in which the exemplary method can be implemented. For sake of illustration and only by way of example, the diagram depicts various session participants as being cell phones connected by one or more serving radio access networks. The process could equally apply with other types of client devices being coupled through other sorts of access channels. More generally, it should be understood that numerous modifications from the arrangements and functions shown and described herein are possible. For instance, elements or functions can be combined, distributed, re-ordered, re-positioned, omitted, or added, while remaining within the scope of the present method and system.

As shown in FIG. 1, the exemplary network includes four representative session participants (or parties) A, B, C, and D, each including a cell phone and a user. Each cell phone is shown being served by a RAN that provides connectivity with a packet switched network 12 on which a conference server 14 such as a PTX server is located. As the cell phones in a given conference can theoretically be served by different RANs, FIG. 1 shows cell phones A and B being served by one RAN 16, cell phone C being served by another RAN 18, and cell phone D being served by another RAN 20. Other arrangements are also possible; for instance, all of the cell phones could be served by a common RAN.

The RANs shown in FIG. 1 can take various forms, two specific examples of which are shown without limitation.

RAN 16 is shown as a cellular RAN, having at least one base transceiver station (BTS) 30, at least one base station controller (BSC) 32, and a mobile switching center (MSC) 34.

Each BTS 30 of RAN 16 may include an antenna tower and associated equipment and preferably radiates to define a radio frequency (RF) air interface (e.g., cell sectors) through which served client devices (such as cell phones A and B) can communicate with the RAN according to an agreed air interface protocol. Examples of air interface protocols include, without limitation, CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. Each BSC 32 controls one or more BTSs and manages aspects of air interface communication, such as handoffs between BTSs or the like. The MSC 34 in turn provides connectivity with a circuit-switched network such as the public switched telephone network (PSTN) for instance.

As shown, the BSC 32 is coupled with a gateway 36, such as a packet data serving node (PDSN), which provides connectivity with packet-switched network 12, which may comprise the Internet and/or a wireless service provider's core packet network. Sitting as a node on the packet-switched network 12, or otherwise accessible via the network, is then conference server 14, which may comprise a PTT server or may take some other form. Consequently, through known procedures, a suitably equipped client device (such as cell phone A or cell phone B) can engage in communication with the conference server, so as to participate in a conference and, in accordance with the present method, an anonymous sidebar. In particular, the client device may establish a radio link traffic channel to communicate with RAN 16 and a point-to-point protocol data link connection with the gateway 36, and the device may acquire an IP address (e.g., mobile-IP address) for communicating on the packet-switched network 12, so as to engage in signaling and/or bearer communication with entities such as conference server 14.

Although not shown, it is also possible that a circuit-switched link could be provided for a client device to communicate with the conference server. For instance, MSC 34 could provide a PSTN link through which the device could engage in a legacy circuit-switched call with the conference server. Thus, a given device (or all devices, for that matter) could participate in a conference through a circuit-switched communication path just as well as a packet-switched communication path. Further, combinations of circuit-switched and packet-switched communications could be used as well.

RAN 18 is shown as a more rudimentary RAN, comprising a simple wireless access point router 42 communicatively linked via gateway 36 with the packet-switched network 12. The access point router 42 may, for instance, be a private Wi-Fi access point operated in a home or office, to provide suitably-equipped client devices with wireless connectivity. Thus, through this arrangement, exemplary client device C can engage in wireless communication with the access point and may communicate in turn, via the gateway 36 and packet-switched network 12, with the conference server 14. RAN 20 is shown generically, to represent the fact that any RAN configuration is possible without limitation.

In FIG. 1, conference server 14 is shown generally including (or having access to) anonymous sidebar data 44. For the present method, the anonymous sidebar data preferably correlates each session participant with a respective private handle, so that a given participant can request initiation of an anonymous sidebar by reference to one or more private handles and the conference server can then initiate the requested sidebar.

Figure 2:
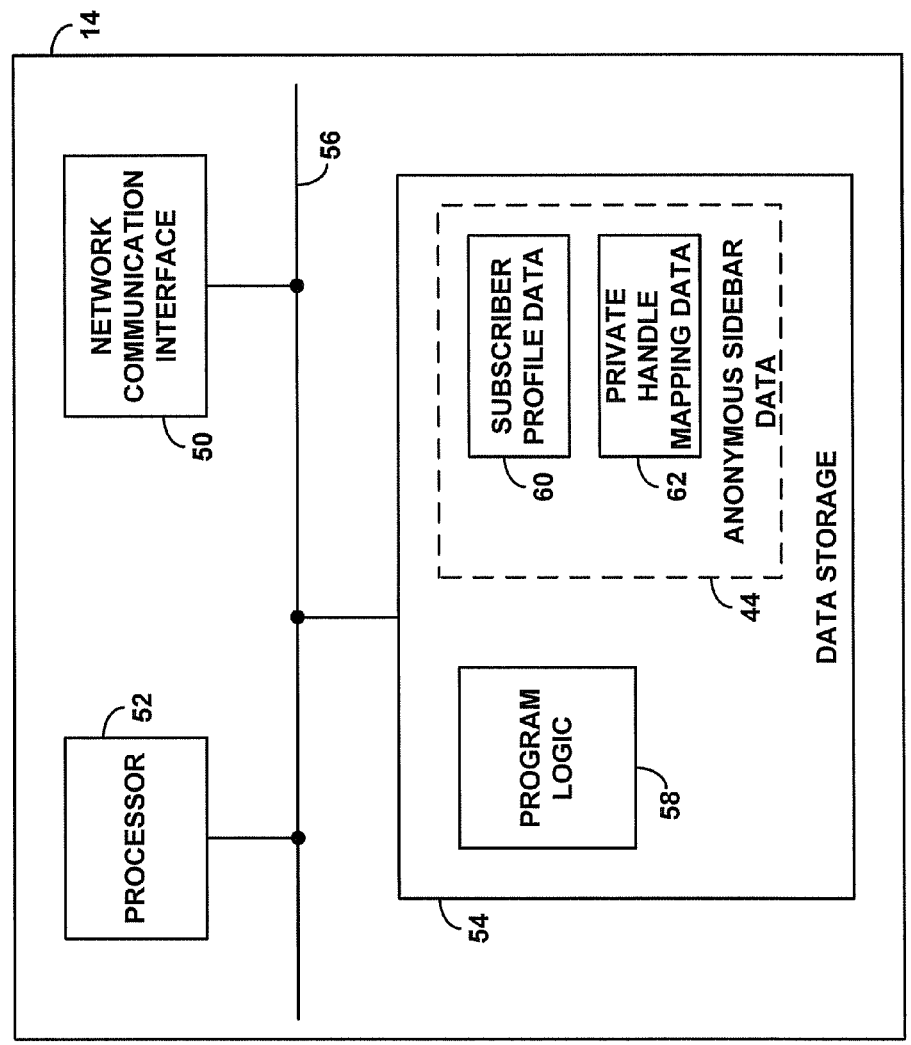
FIG. 2 is a simplified block diagram of a conference server that could implement the exemplary method.

FIG. 2 is a more detailed block diagram depicting components that could be included in server 14 in practice, with the understanding that server 14 could range in complexity from a simple computer to a more complex platform comprising numerous computers or other entities arranged to carry out the functions herein.

As shown in FIG. 2, the exemplary conference server 14 includes a network communication interface 50, a processor 52, and data storage 54, all of which may be communicatively linked together by a system bus, network, or other connection mechanism 56.

The network communication interface 50 comprises a module through which the server 14 can engage in network communication, so as to send and receive signaling messages and bearer traffic for instance. In a scenario where the server communicates over packet-switched network 12, interface 50 may comprise a wired or wireless Ethernet module, perhaps with additional equipment, for coupling the server 14 with the network 12. In a scenario where the server communicates over a circuit-switched link such as the PSTN, interface 50 may comprise a wired or wireless telephone connection or the like for coupling with the PSTN. Other arrangements are possible as well.

Processor 52 comprises one or more general purpose processors (e.g., INTEL microprocessors) and/or one or more special purpose processors (e.g., digital signal processors, application specific integrated circuits, and so forth). Data storage 54, in turn, comprises one more volatile and/or non-volatile storage components, such as optical, magnetic, or organic storage, and may be integrated in whole or in part with processor 52 or with one or more other components of server 14.

As illustrated, data storage 54 holds anonymous sidebar data 44. As noted above, the anonymous sidebar data 44 correlates conference participants with private handles, to enable establishment of anonymous sidebars. Further and more specifically, as shown, the anonymous sidebar data 44 may include subscriber profile data 60 and private handle mapping data 62.

The subscriber profile data 60 may comprise service profile records for each of a plurality of subscriber accounts, and particularly for subscribers to conference service or more generally telecommunication service. For instance, if a wireless service provider provides conference service such as PTT service, the service provider may provision the subscriber profile data 60 with records for each subscriber (e.g., each served client device and/or user). Each subscriber profile record may indicate whether the subscriber subscribes to conference service and/or whether the subscriber subscribes to anonymous sidebar service. Further, each subscriber profile record may set forth a private handle defined for the subscriber, such as one that the subscriber entered through a web-based provisioning interface for instance.

The private handle mapping data 62 may comprise a table that correlates private handles with conference participants, so as to enable establishment of anonymous sidebars. Each record in such a table may be keyed to a particular private handle and may specify a conference participant corresponding with that private handle. It is of course possible that the private handle mapping data be integrated with the subscriber profile data or that the data be provided in some other form as well.

The preferred intent of the private handles is that they preserve anonymity by not stating the true identity of the conference participant. Thus, the private handles should preferably not include a recitation in whole of the telephone number of a participating cell phone or the like, and they should preferably not include a recitation in whole of the name of the participant. However, variations are possible.

The private handle mapping data preferably correlates each private handle with a corresponding conference participant in a manner that will enable the conference server to include the participant in a sidebar. For instance, the data may designate each conference participant in the form of the participant's SSRC or SIP address, or in some other form. Thus, provided with a private handle, the server can use the private handle mapping data to identify the conference participant having that private handle and can take action accordingly.

As further illustrated, data storage 54 also holds program logic 58. The program logic 58 may comprise machine language instructions executable by processor 52 to carry out various functions described herein or various functions associated with those described, to enable practice of the method.

At a base level, for example, the program logic 58 is preferably executable to provide for conference bridging and management functionality, supporting applicable communication protocols such as SIP, H.323, RTP, and various codecs (e.g., G.723.1 and others). As such, the logic is preferably executable to engage in SIP signaling so as to set up RTP conference legs with conference participants, to bridge those legs together so as to enable the parties to communicate with each other, and to manage floor control (if applicable) in the conference.

Furthermore, in accordance with the present method, the program logic 58 is preferably executable to send to each conference participant an indication of the participant's private handle and to receive from the conference participant a confirmation or update of the private handle—and to update the private handle mapping data given any change in private handles. Further, the program logic is preferably executable to send each participant a specification listing the private handles of each other party. And the program logic is further executable to receive from a given participant an sidebar initiation request that designates one or more user-selected private handles from those listed in the specification, to use the private handle mapping data to identify the participants having the designated private handles, and to initiate an anonymous sidebar among the requesting participant and each identified participant. Yet further, the program logic is preferably executable to receive from a given sidebar participant an exit-request and to remove the participant from the sidebar and restore the participant to full participation in the main session. The logic may further be executable to carry out still other functions described above or in line with the intended method.

Figure 3:
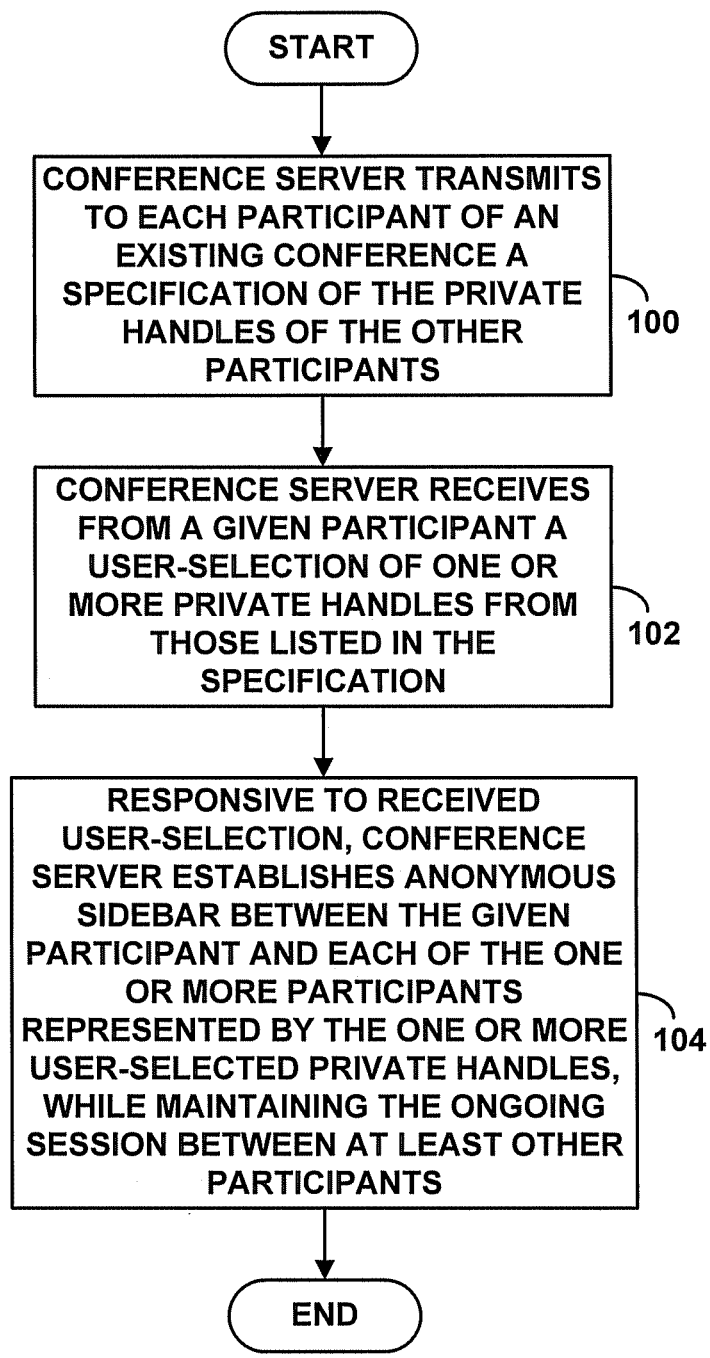
FIG. 3 is a flow chart depicting functions that can be carried out in accordance with the exemplary method.

FIG. 3 is next a flow chart depicting functions that can be carried out by server 14 in accordance with the exemplary method, to establish an anonymous sidebar. As shown in FIG. 3, at block 100, the server first transmits to each participant of an existing conference a specification of the private handles of the other participants. At block 102, the server then receives from a given one of the participants a user selection of one or more private handles from those listed in the specification. At block 104, in response to the received user-selection, the server then establishes an anonymous sidebar between the given participant and each of the one or more participants represented by the one or more user-selected private handles, while maintaining the ongoing session between at least other participants. It should be understood that this method could be carried out for any of a variety of types of conferences, whether participants are connected though circuit-switched, packet-switched, wireless, and/or wired connections, and regardless of the type of devices and media involved. Thus, the method could apply, for instance, in the context of PTT communications.

Figure 4:
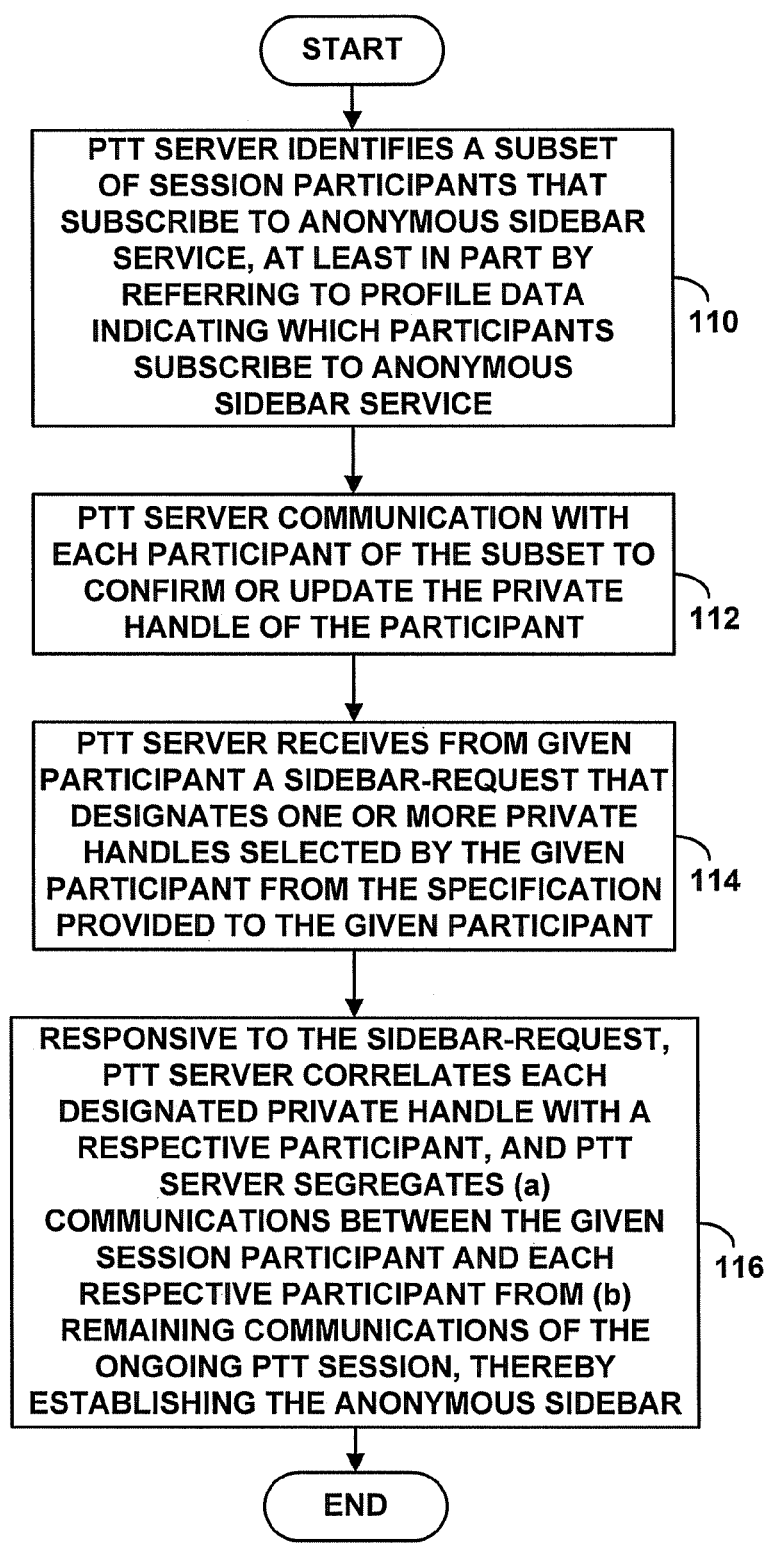
FIG. 4 is another flow chart depicting functions that can be carried out in accordance with the exemplary method.

FIG. 4 is in turn a flow chart depicting an example set of functions that may be carried out by server 14, in order to establish an anonymous sidebar between PTT session participants. As shown in FIG. 4, at block 110, the PTT server identifies a subset of the participants that subscribe to anonymous sidebar service, at least in part by referring to profile data indicating which participants subscribe to anonymous sidebar service. At block 112, the PTT server communicates with each participant of the subset to confirm or update the private handle of the participant. At block 114, during the PTT session, the PTT server receives from a given one of the participants of the subset a sidebar-request that designates one or more private handles selected by the given session participant from the specification provided to the given session participant. And at block 116, still during the PTT session, in response to the sidebar-request, the PTT server correlates each designated private handle with a respective participant, and the PTT server segregates (i) communications between the given session participant and each respective participant from (ii) remaining communications of the ongoing PTT session, thereby establishing the anonymous sidebar.

An exemplary embodiment has been described above. Those of ordinary skill in the art will appreciate that changes to this embodiment are possible while remaining within the scope of the method and system claimed, including their equivalents.

For instance, although the foregoing focuses mainly on packet-switched communications, the exemplary method could just as well be carried out in a circuit-switched environment, such as where conference participants are connected via PSTN telephone call connections with the conference server. In that instance, the control signaling between the server and the participants, such as to send private handle specifications and to receive sidebar-initiation requests, could be conducted through an out-of-band signaling channel, such as through SMS messaging, e-mail messaging (possibly using other communication devices for that signaling), or potentially through transmission of tones representing data within the call legs themselves.

Other examples are possible as well.

What is claimed is:

1. A method of establishing an anonymous sidebar during an ongoing session in which session participants communicate with each other through a central server, the method comprising, during the ongoing session:

at the central server, identifying a subset of the participants that subscribe to anonymous sidebar service, at least in part by referring to profile data indicating which participants subscribe to anonymous sidebar service, wherein each participant of the subset has a private handle representing the participant;

transmitting from the central server to each of the participants of the subset a specification stating the private handle of one or more other participants of the subset;

receiving at the central server, from a given one of the participants of the subset, a user selection of one or more private handles from the transmitted specification; and responsive to the received user selection, the central server establishing an anonymous sidebar between the given participant and each of the one or more participants represented by the one or more user-selected private handles, while maintaining the ongoing session between at least other participants.

2. The method of claim 1, wherein the central server includes or has access to correlation data that correlates the private handles with the participants, and wherein establishing the anonymous sidebar between the given participant and each of the one or more participants represented by the one or more user-selected private handles comprises:
referring to the correlation data to determine for each of the one or more user-selected private handles a corresponding participant;
transmitting to each determined participant a sidebar-invitation, receiving in response from each determined participant a sidebar-participation approval, and then, for the anonymous sidebar, segregating (i) communications between the given participant and each determined participant from (ii) any remaining communications of the ongoing session.

3. The method of claim 1, further comprising:
while the anonymous sidebar is in progress, the central server receiving from a particular participant in the anonymous sidebar an exit-request, and the central server responsively removing the particular participant from the anonymous sidebar.

4. The method of claim 3, further comprising:
in response to the exit-request, the central-server returning the particular participant to the ongoing session.

5. The method of claim 1, wherein the central server allows at least one participant in the anonymous sidebar to concurrently participate in the ongoing session, at least in part by allowing the at least one participant to hear communications in the ongoing session while transmitting sidebar-communications from the at least one participant to only each other participant of the anonymous sidebar.

6. The method of claim 1, further comprising, during the ongoing session, before transmitting the specification to each participant of the subset,
transmitting from the central server to each given one of the participants of the subset an indication of a private handle already defined respectively for the given participant, and then receiving from the given participant either an approval of the private handle or a definition of a new private handle for the given participant.

7. The method of claim 1, further comprising, during the ongoing session, before transmitting the specification to each participant of the subset,
transmitting from the central server to each participant of the subset a request to participate in anonymous sidebar establishment, receiving a response to the request, and basing the specification on the response.

8. The method of claim 1, wherein the private handle for each participant does not include a telephone number.

9. The method of claim 1,
wherein transmitting the specification to each participant of the subset comprises transmitting the specification in an RTP header extension.

10. The method of claim 1, wherein the ongoing session comprises a push-to-x (PTX) session, and each participant comprises a PTX client device operated by a user.

11. The method of claim 10, wherein the PTX session comprises a session selected from the group consisting of a push-to-talk (PTT) session and a push-to-view (PTV) session.

12. The method of claim 1, wherein communications between the central server and each participant occur via a radio access network serving the participant and via an air interface between the radio access network and the participant.

13. The method of claim 1, wherein transmitting the specification to each participant of the subset comprises transmitting the specification in at least one of (i) an RTP header extension, (ii) an RTCP message, or (iii) a SIP message.

14. A method of establishing an anonymous sidebar during an ongoing push-to-talk (PTT) session in which session participants communicate with each other through a PTT server, wherein each participant has a private handle representing the participant, the method comprising:
at the PTT server, identifying a subset of the participants that subscribe to anonymous sidebar service, at least in part by referring to profile data indicating which participants subscribe to anonymous sidebar service;
the PTT server communicating with each participant of the subset to confirm or update the private handle of the session participant;
during the PTT session, providing from the PTT server to each of participant of the subset a specification stating the private handle of each other participant of the subset;
during the PTT session, receiving at the PTT server, from a given one of the participants of the subset, a sidebar-request, the sidebar-request designating one or more private handles selected by the given session participant from the specification provided to the given session participant;
during the PTT session, in response to the sidebar-request, the PTT server correlating each designated private handle with a respective participant, and the PTT server segregating (i) communications between the given session participant and each respective participant from (ii) remaining communications of the ongoing PTT session, thereby establishing the anonymous sidebar.

15. The method of claim 14, wherein the identifying and communicating functions occur during the PTT session.

16. The method of claim 14, wherein the communicating function occurs during setup of the PTT session.

17. The method of claim 14, further comprising:
during the anonymous sidebar, receiving at the PTT server from a particular participant in the anonymous sidebar an exit-request, and, in response to receiving the exit-request, the PTT server removing the particular participant from the anonymous sidebar and returning the particular participant to the PTT session.

18. A push-to-talk (PTT) server comprising:
a network communication interface for sending and receiving communications on a packet-switched network;
a processor;
data storage;
program logic stored in the data storage and executable by the processor, during an ongoing PTT session being hosted by the PTT server, to carry out functions including:
(a) identifying participants of the PTT session that subscribe to anonymous sidebar service, at least in part by referring to profile data that indicates which participants subscribe to anonymous sidebar service,
(b) transmitting to each of identified participant of the PTT session a list specifying a private handle respectively of each other identified participant,
(c) receiving from a given one of the identified participants a sidebar-request that designates one or more private handles selected by the given participant from the transmitted list, and (d) responsive to the request, correlating each designated private handle with a respective one of the identified participants, and setting up a sidebar between the given participant and each respective participant.

19. The PTT server of claim 18, wherein the data storage contains handle-data correlating each identified participant with a respective private handle, and wherein correlating each designated private handle with a respective participant comprises referring to the handle-data to correlate each designated private handle with a respective participant.

20. The PTT server of claim 18, wherein the program logic is further executable to communicate with each identified participant to confirm or update private handle data for the identified participant.

* * * * *